US011477250B2

(12) United States Patent
Riecken et al.

(10) Patent No.: US 11,477,250 B2
(45) Date of Patent: Oct. 18, 2022

(54) APPARATUS AND METHOD FOR MANAGING EVENTS IN A COMPUTER SUPPORTED COLLABORATIVE WORK ENVIRONMENT

(71) Applicant: AT&T Intellectual Property I, L.P., Atlanta, GA (US)

(72) Inventors: Douglas Riecken, Plainfield, NJ (US); James G. Beattie, Jr., Bergenfield, NJ (US); Amee Fontanetta, Cliffwood Bch, NJ (US); Luis Ramos, Columbia, CT (US); Roque Rios, III, Middletown, NJ (US); Stephen Francis Triano, Hillsborough, NJ (US); Eshrat Huda, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/016,050

(22) Filed: Sep. 9, 2020

(65) Prior Publication Data
US 2020/0412776 A1    Dec. 31, 2020

Related U.S. Application Data

(62) Division of application No. 14/700,737, filed on Apr. 30, 2015, now Pat. No. 10,819,759.

(51) Int. Cl.
*H04L 29/06* (2006.01)
*G06F 3/0484* (2022.01)
(Continued)

(52) U.S. Cl.
CPC ........ *H04L 65/403* (2013.01); *G06F 3/04842* (2013.01); *G06F 40/12* (2020.01); *G06Q 10/101* (2013.01); *H04L 67/14* (2013.01)

(58) Field of Classification Search
CPC ..... G06F 40/12; G06F 3/04842; H04L 67/14; H04L 65/403; G06Q 10/101
See application file for complete search history.

(56) References Cited

U.S. PATENT DOCUMENTS

| 5,008,853 A | 4/1991 | Bly et al. |
| 5,689,641 A | 11/1997 | Ludwig et al. |

(Continued)

FOREIGN PATENT DOCUMENTS

| EP | 1788502 A1 | 5/2007 |
| EP | 1860822 A1 | 11/2007 |

(Continued)

OTHER PUBLICATIONS

"About Synergeia." ITCOLE—Innovative Technologies for Collaborative Learning and Knowledge Building, bscl.fit.fraunhofer.de https://bscl.fit.fraunhofer.de/en/about.html, Mar. 23, 2015.

(Continued)

*Primary Examiner* — Abdulkader M Alriyashi
(74) *Attorney, Agent, or Firm* — Guntin & Gust, PLC; Atanu Das

(57) ABSTRACT

Aspects of the subject disclosure may include, for example, participating in a communication session over a network with a second communication device that is remote from the communication device where the communication session includes a computer supported collaborative work environment utilizing a non-baton passing protocol, presenting content at a display device where the content is presented by the second communication device at a second display device, receiving first user input at the user interface where second user input is received by the second communication device where a conflict resolution is applied to events (Continued)

associated with the first and second user input, and presenting adjusted content at the display device. Other embodiments are disclosed.

20 Claims, 11 Drawing Sheets

(51) Int. Cl.
| | |
|---|---|
| *H04L 29/08* | (2006.01) |
| *G06Q 10/10* | (2012.01) |
| *G06F 40/12* | (2020.01) |
| *H04L 65/403* | (2022.01) |
| *G06F 3/04842* | (2022.01) |
| *H04L 67/14* | (2022.01) |

(56) References Cited

U.S. PATENT DOCUMENTS

| | | | |
|---|---|---|---|
| 5,996,002 | A | 11/1999 | Katsurabaya et al. |
| 6,119,147 | A | 9/2000 | Toomey et al. |
| 6,507,845 | B1 | 1/2003 | Cohen et al. |
| 6,567,844 | B2 | 5/2003 | Fukasawa |
| 6,571,285 | B1 | 5/2003 | Groath et al. |
| 6,958,981 | B1 | 10/2005 | Hemminger |
| 6,981,019 | B1 | 12/2005 | Boies et al. |
| 7,100,116 | B1 | 8/2006 | Shafrir et al. |
| 7,103,846 | B1 | 9/2006 | Shafrir et al. |
| 7,107,307 | B1 | 9/2006 | Takishita |
| 7,346,671 | B2 | 3/2008 | Hankejh et al. |
| 7,715,331 | B2 | 5/2010 | Salesky et al. |
| 7,747,688 | B2 | 6/2010 | Narayanaswami et al. |
| 7,774,703 | B2 | 8/2010 | Junuzovic et al. |
| 7,813,304 | B2 | 10/2010 | Salesky et al. |
| 7,865,463 | B2 | 1/2011 | Sollicito et al. |
| 7,904,515 | B2 | 3/2011 | Ambati et al. |
| 7,966,634 | B2 | 6/2011 | Hoppe et al. |
| 8,086,713 | B2 | 12/2011 | Gandhewar et al. |
| 8,108,779 | B1 | 1/2012 | Dolgov et al. |
| 8,161,108 | B2 | 4/2012 | Choi et al. |
| 8,209,574 | B2 | 6/2012 | Pendakur et al. |
| 8,230,351 | B2 | 7/2012 | Patton et al. |
| 8,280,948 | B1 | 10/2012 | Chen |
| 8,316,117 | B2 | 11/2012 | Nguyen et al. |
| 8,812,961 | B2 | 8/2014 | Srinivasaraghav et al. |
| 8,873,669 | B1 | 10/2014 | Lewis et al. |
| 8,965,978 | B2 | 2/2015 | Chandranmenon et al. |
| 8,977,684 | B2 | 3/2015 | Alexandrov et al. |
| 9,166,978 | B2 | 10/2015 | Adderly et al. |
| 2003/0208541 | A1 | 11/2003 | Musa |
| 2004/0143630 | A1 | 7/2004 | Kaufmann et al. |
| 2004/0179036 | A1 | 9/2004 | Teplov et al. |
| 2005/0033807 | A1 | 2/2005 | Lowrance et al. |
| 2005/0159968 | A1 | 7/2005 | Cozzolino |
| 2005/0183035 | A1 | 8/2005 | Ringel et al. |
| 2006/0036971 | A1 | 2/2006 | Mendel et al. |
| 2006/0053195 | A1 | 3/2006 | Schneider et al. |
| 2006/0129650 | A1 | 6/2006 | Ho et al. |
| 2006/0277285 | A1* | 12/2006 | Boyd ............... H04L 67/14 709/223 |
| 2007/0100937 | A1* | 5/2007 | Burtner, IV ......... G06Q 10/10 709/204 |
| 2007/0198635 | A1 | 8/2007 | Lindner et al. |
| 2007/0282947 | A1 | 12/2007 | Hupfer et al. |
| 2007/0294626 | A1 | 12/2007 | Fletcher et al. |
| 2010/0174783 | A1 | 7/2010 | Zarom et al. |
| 2010/0281169 | A1 | 11/2010 | Charles |
| 2011/0307557 | A1 | 12/2011 | Kadashevich et al. |
| 2012/0149308 | A1 | 6/2012 | Rothkopf |
| 2014/0164934 | A1* | 6/2014 | Yang ............... G06Q 10/101 715/738 |
| 2014/0274187 | A1 | 9/2014 | Kerger et al. |
| 2014/0310680 | A1 | 10/2014 | Howard |
| 2014/0362165 | A1 | 12/2014 | Ackerman et al. |
| 2016/0259508 | A1 | 9/2016 | Eccleston et al. |
| 2016/0323327 | A1 | 11/2016 | Riecken |
| 2016/0323328 | A1 | 11/2016 | Riecken |

FOREIGN PATENT DOCUMENTS

| | | |
|---|---|---|
| EP | 2168059 A1 | 3/2010 |
| EP | 2332026 A1 | 6/2011 |
| EP | 2700218 A1 | 2/2014 |

OTHER PUBLICATIONS

"Awareness." BSCW—Basic Support for Cooperative Work, public.bscw.de http://www.bscw.de/english/awareness.html, Mar. 23, 2015.
"You've got questions," GoToMeeting, gotomeeting.com http://www.gotomeeting.com/online/meeting/online-meeting-support Q: How do I monitor my learners during a training session? A: Using the GoToTraining Dashboard, organizers can easily check attendance.
Beca, Lukasz M. , "Tango—a collaborative environment for the world-wide web." (1997).
Bellotti, Victoria et al., "Walking away from the desktop computer distributed collaboration and mobility in a product design team." Proceedings of the 1996 ACM conference on Computer supported cooperative work. ACM, 1996.
Detienne, Francoise , "Collaborative design: Managing task inter-dependencies and multiple perspectives." Interacting with computers 18.1 (2006): 1-20.
Dourish, Paul et al., "Portholes: Supporting awareness in a distributed work group." Proceedings of the SIGCHI conference on Human factors in computing systems. ACM, 1992.
Greenberg, Saul et al., "Groupware toolkits for synchronous work." (1996).
Gross, , "PRAVTA—A Light-Weight WAP Awareness Client." Proc. Workshop 'WAP-Interaktionsdesign und Benutzbarkeit', 'Mensch und Computer' conference, Bonn, Germany. 2001.
Izadi, Shahram et al., "The FUSE platform: supporting ubiquitous collaboration within diverse mobile environments." Automated Software Engineering 9.2 (2002): 167-186.
Johnson, David , "Mobile Support in CSCW Applications and Groupware Development Frameworks." iJIM 7.2 (2013): 54-62.
Papadopoulos, , "Improving awareness in mobile cscw." Mobile Computing, IEEE Transactions on 5.10 (2006): 1331-1346.
Pedersen, et al., "AROMA: abstract representation of presence supporting mutual awareness." Proceedings of the ACM SIGCHI Conference on Human factors in computing systems. ACM, 1997.
Rodden, Tom , "A survey of CSCW systems." interacting with Computers 3.3 (1991) 319-353.

* cited by examiner

100

116A

116A

500

700

APPARATUS AND METHOD FOR MANAGING EVENTS IN A COMPUTER SUPPORTED COLLABORATIVE WORK ENVIRONMENT

CROSS REFERENCE TO RELATED APPLICATIONS

This application is a divisional of U.S. patent application Ser. No. 14/700,737, filed Apr. 30, 2015. The contents of the foregoing are hereby incorporated by reference into this application as if set forth herein in full.

FIELD OF THE DISCLOSURE

The subject disclosure relates to an apparatus and method for managing events in a computer supported collaborative work environment.

BACKGROUND

Multimedia communication services for more than one user, such as between groups of individuals working together, are known. These services allow multiple persons to work distributed from each other in various locations, and as they collaborate, they work in a virtual environment hosted by technologies that enable the users to create and share data. A baton passing protocol is sometimes employed where whichever participant is "holding the baton" (i.e., they have presenter rights) can perform various actions with respect to the data (e.g., documents) in the virtual environment. However, the baton passing protocol can be inefficient since passing of the baton each time to a new user can be time consuming.

BRIEF DESCRIPTION OF THE DRAWINGS

Reference will now be made to the accompanying drawings, which are not necessarily drawn to scale, and wherein.

DETAILED DESCRIPTION

Figure 1:
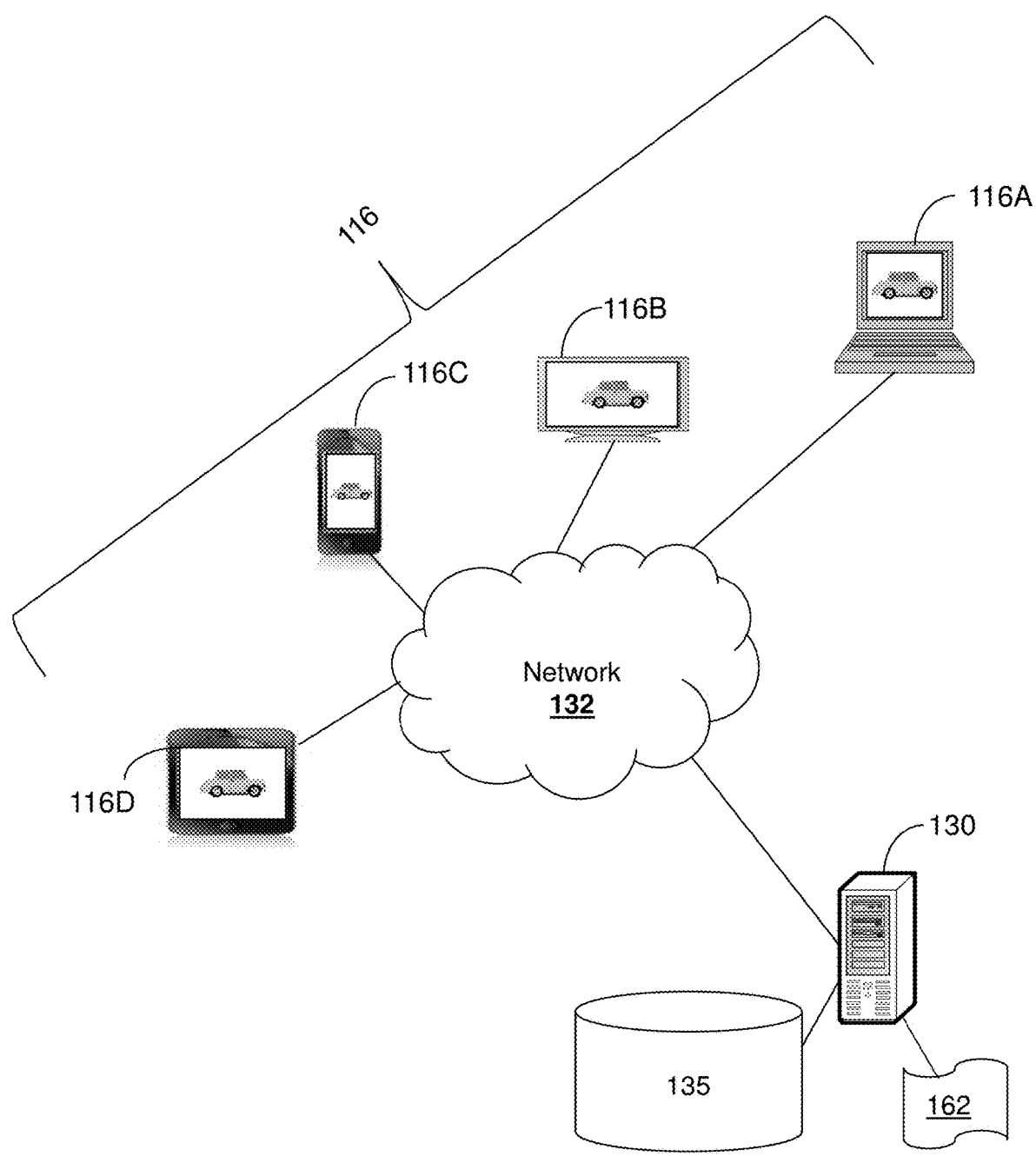
FIG. 1 depicts an illustrative embodiment of a system for providing a collaborative environment for multiple communication devices.

The subject disclosure describes, among other things, illustrative embodiments for establishing a Computer Supported Collaborative Work (CSCW) environment that enables multiple users to generate or otherwise cause events to occur in the CSCW environment. The events can be any type of event that changes the CSCW environment such as editing content, adding content, deleting content, changing views, and so forth. A conflict between events generated by different communication devices can be detected and a conflict resolution technique can be applied to determine which, if any, of the events (in whole or in part) is to be implemented in the CSCW environment. The CSCW environment can operate under a non-baton passing protocol. Other embodiments are described in the subject disclosure.

One or more aspects of the subject disclosure include determining a conflict between two or more events and applying conflict resolution, such as a priority determination, control layering, and/or other techniques, so that the conflict can be resolved and the event can be presented at the other communication devices participating in the CSCW environment. The priority determination can be based on different devices having different priorities and/or different events having different priorities. The control layering can be based on different devices being authorized to perform different control commands.

One embodiment of the subject disclosure is a communication device including a user interface, a processor coupled with the user interface, and a memory that stores executable instructions that, when executed by the processor, facilitate performance of operations. The communication device can perform operations including participating in a communication session over a network with a second communication device that is remote from the communication device, where the communication session comprising a computer supported collaborative work environment utilizing a non-baton passing protocol. The communication device can present content at a display device, where the content is presented by the second communication device at a second display device. The communication device can receive first user input at the user interface, where second user input is received by the second communication device, where the content is adjusted according to the first and second user input to generate adjusted content, where the first user input is associated with a first group of control commands, where the second user input is associated with a second group of control commands, where the processor is prohibited from performing the second group of control commands, and where the second communication device is prohibited from performing the first group of control commands. The communication device can present the adjusted content at the display device.

One embodiment of the subject disclosure is a machine-readable storage device, comprising executable instructions that, when executed by a processor of a communication device, facilitate performance of operations. The processor can participate in a communication session over a network with a second communication device that is remote from the communication device, where the communication session comprises a computer supported collaborative work environment utilizing a non-baton passing protocol. The processor can present content at a display device, where the content is presented by the second communication device at a second display device. The processor can present a first graphical pointer at the display device and can receive first user input. The processor can adjust the first graphical pointer according to the first user input to generate a first adjustment to the first graphical pointer and can presenting, at the display device, the first adjustment to the first graphical pointer while presenting the content. The processor can present, at the display device, a second graphical pointer at the display device while presenting the first adjustment to the first graphical pointer and while presenting the content, where the second communication device receives second user input, and where the second communication device adjusts the second graphical pointer according to the second user input to generate a second adjustment to the second graphical pointer. The processor can present, at the display device, the second adjustment to the second graphical pointer while presenting the first adjustment to the first graphical pointer and while presenting the content, where the first and second graphical pointers are visually distinguishable, and where the second graphical pointer includes identification information associated with the second communication device.

One embodiment of the subject disclosure is a method including facilitating establishing, by a system including a processor, a communication session over a network between a group of communication devices including first and second communication devices, where the communication session comprises a computer supported collaborative work environment utilizing a non-baton passing protocol, where content is presented via the communication session by the group of communication devices at a group of display devices. The method can include receiving, by the system from the first communication device, first adjustment data generated by the first communication device according to first user input at the first communication device, where the first adjustment data is representative of a first adjustment made by the first communication device to the content according to the first user input to generate first adjusted content. The method can include receiving, by the system from the second communication device, second adjustment data generated by the second communication device according to second user input at the second communication device, where the second adjustment data is representative of a second adjustment made by the second communication device to the content according to the second user input to generate second adjusted content. The method can include determining, by the system, a conflict between the first and second adjustments. The method can include selecting, by the system, the first adjustment data according to a priority determination indicating that the first adjustment has priority over the second adjustment. The method can include providing, by the system to the second communication device, the first adjustment data to enable the second communication device to generate and present the first adjusted content at a second display device of the group of display devices.

One or more aspects of the subject disclosure include monitoring feedback from a recipient device where the feedback indicates whether a content change generated by a source device has been presented at the recipient device. According to the feedback information, the source device can present an indicator representing the presentation of the content change at the recipient device. In this example, the user of the source device where the content change was generated will then know when the other user of the recipient device is viewing the content change. The indicator can be provided utilizing various techniques and in various forms. For instance, a format of the content change can be adjusted to represent when the recipient device has presented the content change. In other embodiments, the indicator can be a separate icon or other indicia that indicates when the content change has been presented by the recipient device. In one embodiment, the icon or indicia can identify the recipient device and can change according to whether or not the content change has been presented at the recipient device. For instance, an icon identifying the recipient device can have a line through it, can be transparent, and/or can be the color red prior to the presentation of the content change at the recipient device. Responsive to the recipient device presenting the content change (and based on feedback information being provided by the recipient device), the icon can have the line removed, can become non-transparent, and/or can be the color green. This process can be repeated each time there is a content change by the source device or by another device that is participating in the communication session.

The CSCW environment enables individuals to work, design, create artifacts, share applications, and/or gaming (as well as any other collaborative interaction) via various multimedia mediums and multimodal input devices. Their collaborations in a virtual working environment can include: working with multimedia documents (e.g., text, image, video, audio files, and so forth), working on digital whiteboards, interacting via voice and video communications, and so forth.

One embodiment of the subject disclosure is a communication device including a user interface, a processor coupled with the user interface, and a memory that stores executable instructions that, when executed by the processor, facilitate performance of operations. The processor can participate in a communication session over a network with a second communication device that is remote from the communication device and can present content at a display device. The processor can receive user input at the user interface and can adjust the content according to the user input to generate adjusted content. The processor can present the adjusted content at the display device in real time responsive to the receiving of the user input and can provide adjustment data over the network, where the adjustment data is representative of the adjusting of the content according to the user input, and where the adjustment data enables the second communication device to generate and present the adjusted content at a second display device connected with the second communication device. The processor can receive a feedback signal indicating that the second communication device has presented the adjusted content at the second display device. The processor can present a feedback indicia at the display device responsive to the receiving of the feedback signal, wherein the feedback indicia indicates that the second communication device has presented the adjusted content at the second display device.

One embodiment of the subject disclosure includes a machine-readable storage medium, comprising executable instructions that, when executed by a processor of a communication device, facilitate performance of operations. The processor can participate in a communication session over a network with a group of other communication devices and can present content at a display device, where the content is presented by the group of other communication devices at a group of other display devices. The processor can receive adjustment data over the network from a second communication device of the group of other communication devices, where the adjustment data is representative of an adjustment of the content according to user input received at the second communication device, and can adjust the content according to the adjustment data to generate adjusted content. The processor can present the adjusted content at the display device and can provide feedback information over the network indicating that the adjusted content has been presented by the communication device at the display device, where the providing of the feedback information enables the second communication device to present a feedback indicia at a second display device of the group of other display devices, and where the feedback indicia indicates that the communication device has presented the adjusted content at the display device.

One embodiment of the subject disclosure includes facilitating establishing, by a system including a processor, a communication session over a network between a group of communication devices including first and second communication device. The system can receive, from the first communication device, adjustment data generated by the first communication device according to user input at the first communication device, where the adjustment data is representative of an adjustment made by the first communication device to content according to the user input to generate adjusted content, where the content is presented by the group of communication devices at a group of display devices. The system can provide, to the second communication device, the adjustment data to enable the second communication device to generate and present the adjusted content at a second display device of the group of display devices. The system can receive, from the second communication device, feedback information indicating that the second communication device has presented the adjusted content at the second display device. The system can provide, to the first communication device, a feedback signal that enables the first communication device to present a feedback indicia at a first display device of the group of display devices, where the feedback indicia indicates that the second communication device has presented the adjusted content at the second display device.

The exemplary embodiments can also include one or more features described in U.S. patent application Ser. No. 14/700,729, filed Apr. 30, 2015, by Riecken et al. entitled "Apparatus and Method for Providing a Computer Supported Collaborative Work Environment." All sections of the aforementioned application(s) are incorporated herein by reference in its entirety.

FIG. 1 depicts an illustrative embodiment of a system 100 that provides for content collaboration, such as via a CSCW environment that enables a user to know when local changes made at the user's device are presented at other devices. System 100 can include a group of communication devices 116 that participate in a communication session that establishes the CSCW environment. Any number of communication devices 116 and any type of communication devices can be utilized in system 100, including desktop computers, laptop computers, tablets, mobile phones, set top boxes, televisions and so forth. In one embodiment, a conference server 130 can be utilized to manage all or a portion of the CSCW environment over a network 132. The conference server 130 can be a single computing device, such as a centralized or a dedicated server, or can be a number of devices, such as in a distributed control environment. In one embodiment, the conference server 130 can be a network device. In another embodiment, the conference server can be a user device, such as one of the communication devices 116 that is a participant in the CSCW environment and also manages some of the aspects of the CSCW environment. In one embodiment, the conference server 130 can be in communication with a database 135 which is populated with persistent state information of multimedia actions and events occurring in the CSCW environment.

In one embodiment, the conference server 130 can setup, manage, and/or breakdown multiparty virtual multimedia working rooms/sessions that support input from multiple participants (via devices 116) who generate (simultaneously or separately) input events (e.g., typing, editing, drawing, dragging, and so forth). In one embodiment, the input events can be serialized to create partial orderings of the work activities generated by the participant devices 116. In one embodiment, a First-In-First-Out (FIFO) protocol, such as operated by FIFO server components of the conference server 130, can be employed which serializes a diversity of input events from the participant devices 116. In one embodiment, the events can be a diversity of different multimedia processes to be performed.

The conference server 130 can perform functions 162 (such as via execution of a set of machine-readable instructions) which include managing feedback of some or all actions being performed by some or all participants in the CSCW environment and/or supporting baton passing and/or non-baton passing protocols in the CSCW environment. In one embodiment, all actions performed by any of the participant devices 116 in the CSCW environment (e.g., which adjust the collaborative presentation) can be monitored for presentation at all of the devices and feedback can be provided to one or more the devices 116, such as the source device that generated the particular adjustment to the content.

System 100 can deliver anytime-anywhere multimedia communication services between groups of participants working together. Multiple participants, via devices 116, can work in the same or various locations. As the participants collaborate, they can work in a virtual environment (i.e., the CSCW environment) that enables the participants to create, modify and/or share work artifacts (e.g., documents, designs, execution of software applications, and so forth). In one embodiment, system 100 can employ a baton passing protocol whereby whichever participant is "holding the baton" indicating that they have presenter rights, can perform various actions (e.g., create, edit, save, delete, and so forth) on the documents and applications present in the CSCW environment. In another embodiment, system 100 enables all or some of the participants to perform all or some of the legal actions associated with the CSCW environment without "holding the baton" such that there is no need for a baton granting presenter's rights. Thus participants at their discretion can elect when they wish to work with a baton passing protocol or not. This provides greater flexibility and efficiencies in team interactions; for example, tasks can be parallelized during meetings. It can also be observed that participants would be able to perform and work together in a more natural setting, typical to a real-world situation.

In one embodiment, the conference server 130 can manage feedback delivered to an individual performing an action and/or all or some of the other participants observing the action. The conference server 130 can serialize sets of inputs occurring from the multiple actions being performed (e.g., simultaneously) by participants at the devices 116. The conference server 130 can process the input of multiple actions in a FIFO manner which enables organizing the observed outcome of multiple simultaneous actions in a serialized result observed by all participants.

System 100 can provide feedback for an individual who performs an action (e.g., typing a sentence, drawing a line, presenting a PowerPoint slide, and so forth). In one embodiment, as the individual makes an adjustment to the CSCW environment (e.g., introduces a PowerPoint slide, draws a line on a document currently in the work environment, and so forth), completion of the action requires feedback that the action was performed correctly on the individual's local device and feedback that the result(s) of the action were propagated and presented (or otherwise performed) correctly on all the participants' devices.

In one embodiment, immediate feedback for the user performing the action on their local device can be provided and feedback indicating when the results of the action appear on all the participants' local devices is monitored and then presented at the local device (i.e., the source device that made the change to the CSCW environment). For example, a user can draw a line, type a character, write with digital ink and so forth and the visual result of drawing or typing on the local device of that user is immediate without delay, thus providing a natural environment for the user.

System 100 also accounts for latency introduced in propagating the results of the action to the various remote participant devices. Feedback can be provided as to when the remote participants can view the actions performed. For example, when a participant introduces a new PowerPoint slide to the CSCW environment, this participant can determine when to discuss the slide once the feedback mechanism indicates that the slide has been transmitted and is viewable on the remote devices of the other participants.

Figure 2:
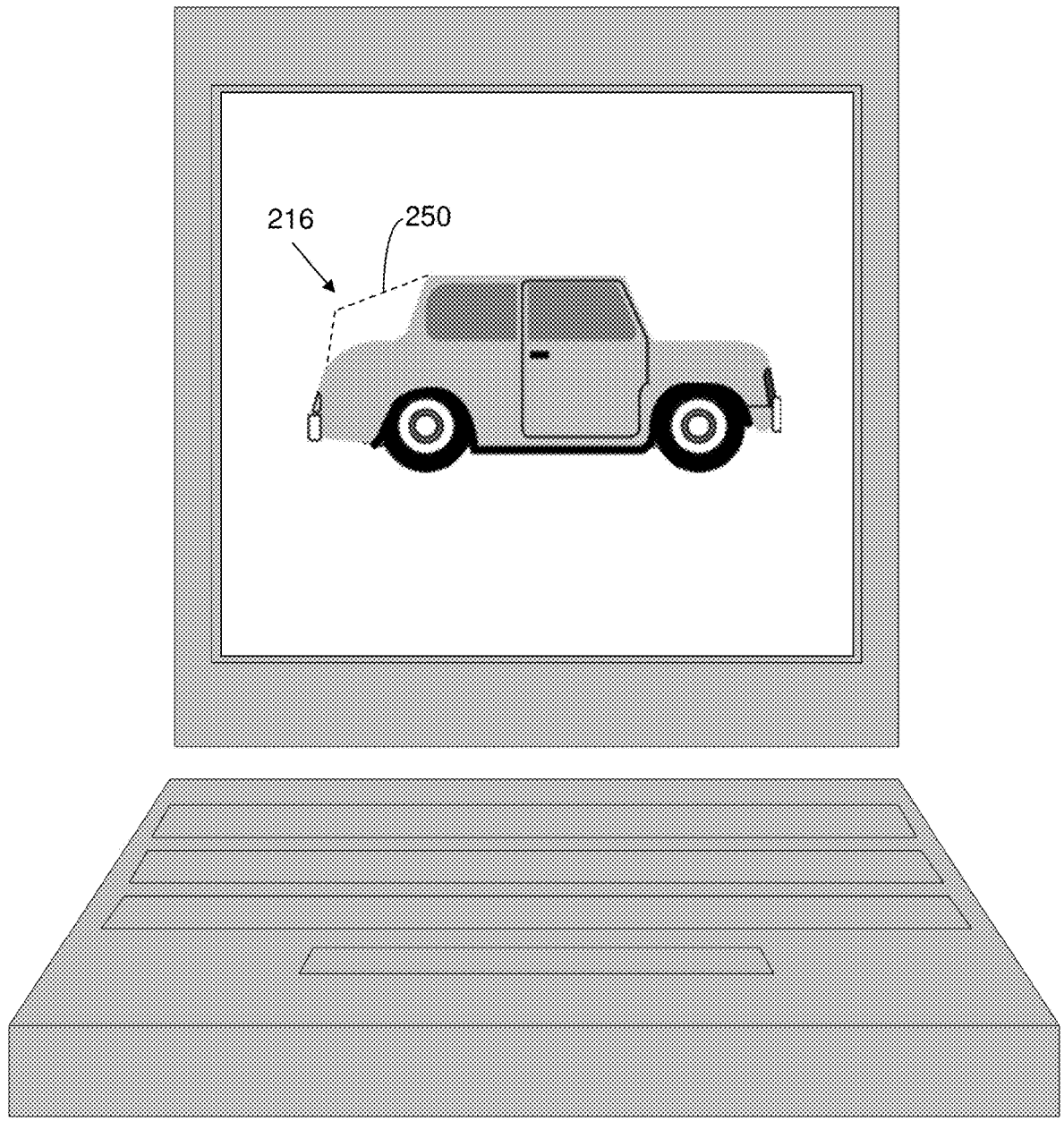
FIGS. 2-4 depict an illustrative embodiment of a communication device operating in the system of FIG. 1 and providing feedback information and event management.

Referring additionally to FIG. 2, communication device 116A is illustrated in which content (an image or a drawing of an automobile) is illustrated. The content can be presented by all of the devices 116, as shown in FIG. 1. The user of communication device 116A makes an adjustment 216 to the content, which in this case is changing the shape of the back end of the automobile. As adjustment 216 is inputted into communication device 116A (e.g., via a keyboard, mouse, stylus, or any other user input) it is presented immediately or in real time at the display of communication device 116A so that the user can see the changes as they are being made. In one embodiment, the adjustment 216 is initially presented in a first format (e.g., as a dashed line) as a non-presentation indicia 250 to indicate that the adjustment 216 has not yet been presented at one or more other devices (e.g., 116B, 116C, 116D) that are participating in the CSCW environment.

Figure 3:
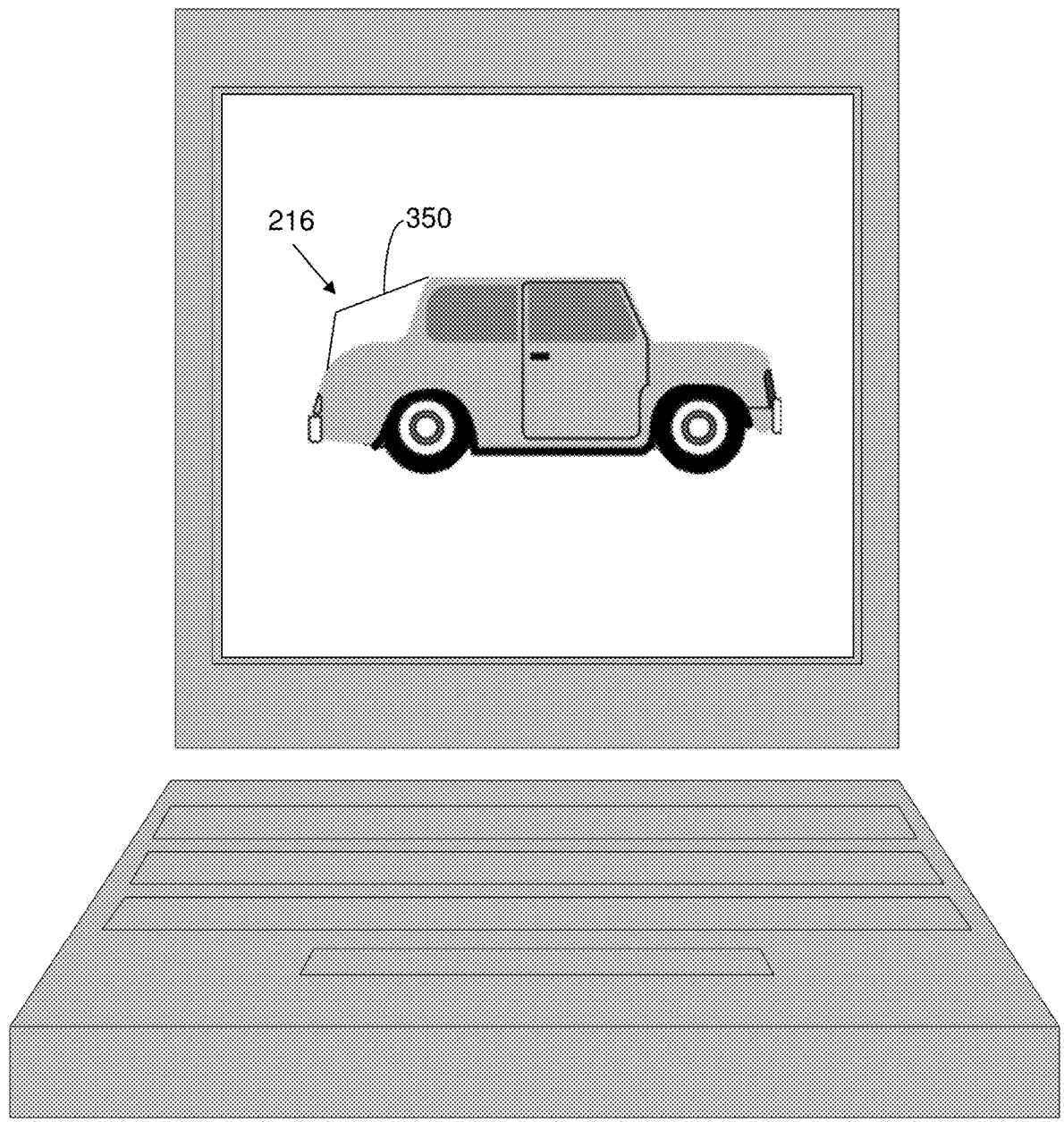

Referring additionally to FIG. 3, once the adjustment 216 has been presented at the one or more other devices (e.g., 116B, 116C, 116D) that are participating in the CSCW environment then the adjustment 216 can be presented in a second format (e.g., as a solid line) as a presentation indicia 350 to indicate that the adjustment 216 has been presented at the one or more other devices. This example describes the format change as being broken lines to solid lines, but the format changes can be of various types including color changes, font changes, size changes, motion changes (e.g., jittering line to stable line), blinking changes, and so forth. In one embodiment, the presentation of the presentation indicia 350 to indicate that the adjustment 216 has been presented at the one or more other devices can be done only after the feedback from the communication devices 116B-D indicates that the adjustment 216 has been presented at all of the devices 116B-D. In another embodiment, the non-presentation indicia 250 and the presentation indicia 350 can include a range of formats to indicate which of the communication devices 116B-D has been presented the adjustment 216. For example, the initial non-presentation indicia 250 can be multi-colored (e.g., different portions of the adjustment 216 having different colors) with each of the colors representing one of the other devices 116B-D. As the adjustment 216 is presented at each of the other devices 116B-D, the corresponding color for that particular device can be changed to black. Once the adjustment 216 has been presented at all of the communication device 116B-D, the entire adjustment 216 can be black representing that all of the devices have presented the adjustment 216. In one embodiment, a color code can be presented so that the user of communication device 116A knows which devices have or have not presented the adjustment 216. This particular example is described with respect to utilizing multiple colors, but the exemplary embodiments can be utilize other format changes, such as blinking of the light at variable speeds (e.g., faster blinking indicating fewer devices have presented the adjustment 216 and faster blinking indicating more of the devices have presented the adjustment 216. In this example, the speed of the blinking can be indicative of the number of devices 116B-D that have presented the adjustment 216, although the identity of those devices may not be presented to the user of communication device 116A. In other embodiments, the changing of the format (e.g., over a range of formats such as the multi-color example above) can identify which of the communication devices 116B-D have presented the adjustment 216.

Figure 4:
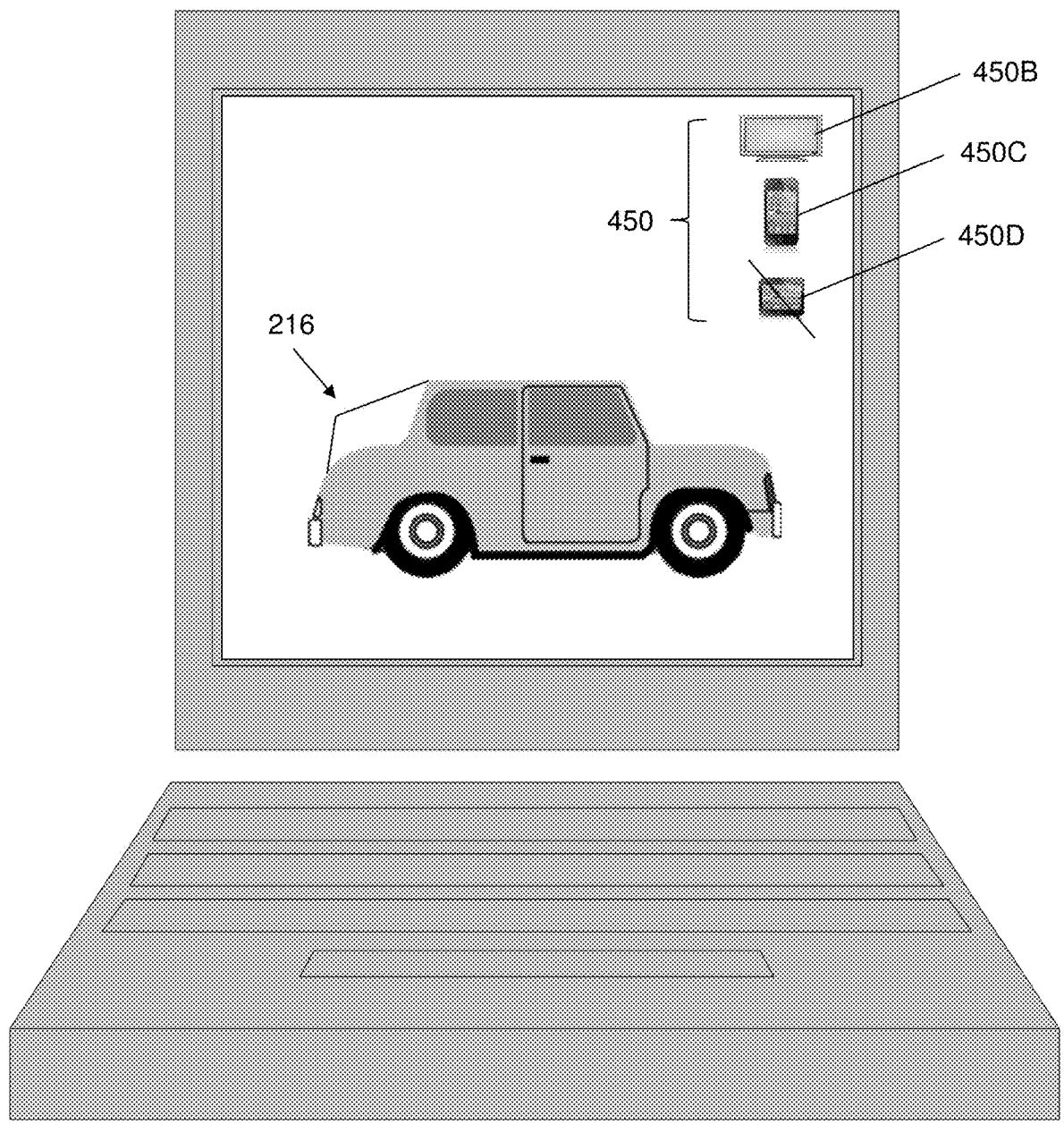

Referring to FIG. 4, communication device 116A is illustrated in which the adjustment 216 to the content is illustrated (e g, immediately when the user of device 116A inputs the adjustment) and a group of feedback icons 450 are presented to indicate whether the adjustment has been presented at the other devices 116B-D. In this embodiment, the feedback indicia is separate feedback icons for each of the other communication devices 116B-D participating in the CSCW environment. The icons 450 can identify the particular users of each of the devices 116B-D and/or can be distinct from each other so as to identify the particular device 116B-D. The icons 450 can change to indicate presentation or a lack of presentation of the adjustment 216, such as having a line through the icon when the adjustment has not yet been presented but removing the line once the presentation has been performed by the particular other device. Other changes in the icon can be used to signify a presentation or a lack of presentation of the adjustment 216, such as changing from red to green colors.

In one embodiment, the icons 450 can also provide other information associated with the particular device 116B-D (e.g., established connection, type of device, bandwidth, and so forth). In another embodiment, the icons 450 can be a selectable link to enable other operations associated with the CSCW environment, such as selecting an icon of a device that is having difficulty receiving and presenting adjustment 216 so that the server 130 can determine if another connection is available for that particular device.

In one or more embodiments, system 100 can employ multimedia application device drivers to perform various operations including: performing multimedia actions (e.g., drawing) on the local client device of the originating participant performing the multimedia action; performing a feedback-multimedia-action on the local client device of the originating participant who performed the initial multimedia action where the feedback communicates to the originating participant that the initial action has been transmitted and presented to the remote participants on their remote client devices; performing the necessary functions to transmit and present to all remote participants in a CSCW working session a multimedia action performed by a participant; and/or performing history functions by maintaining persistent state information of the sequence of all events/actions occurring during a CSCW working session.

Figure 5:
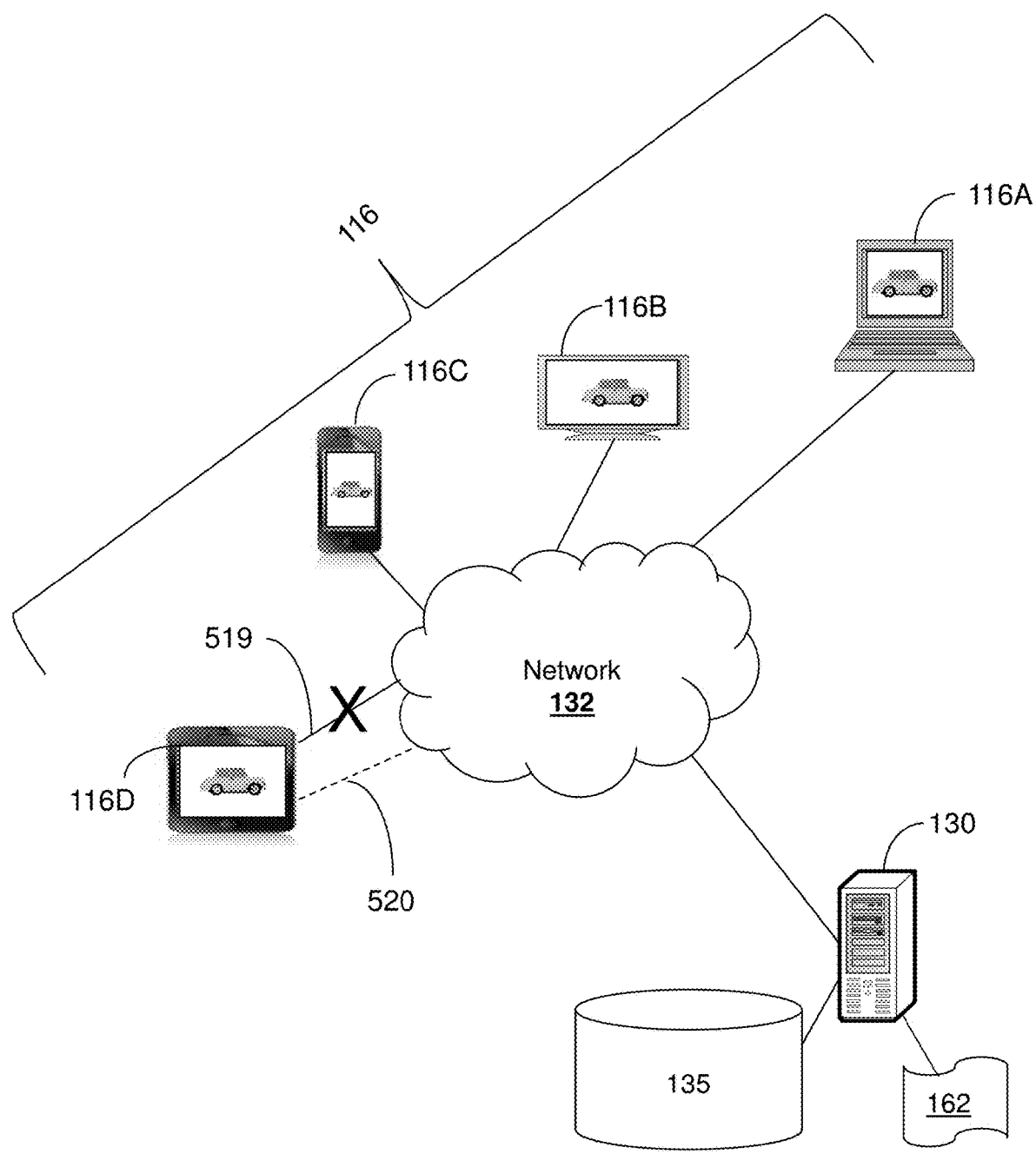
FIG. 5 depicts an illustrative embodiment of a system for providing a collaborative environment for multiple communication devices including connection adjustments and event management.

Referring to FIG. 5, system 500 is illustrated in which communication devices 116A-D participate in a CSCW environment that is being managed in whole or in part by conference server 130. Upon determination of a failure to present the adjustment 216 at device 116D, the conference server 130 can attempt to adjust the connection 519 that the device is utilizing for the CSCW environment. The adjustment of the connection can include adjusting parameters of the connection (e.g., bandwidth, network resources, and so forth) and/or can include establishing another connection 520 for the communication device 116D.

Figure 6:
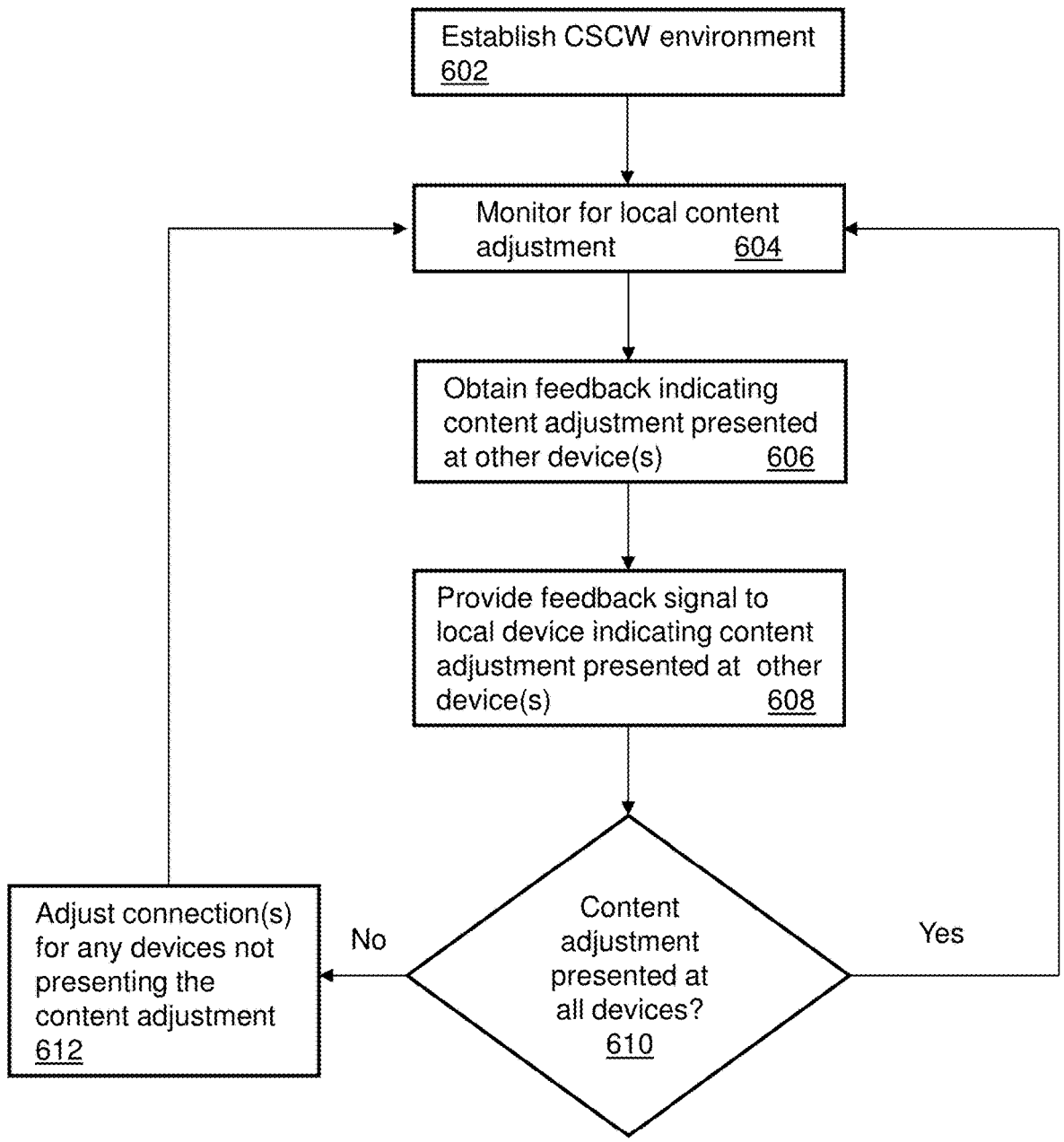
FIG. 6 depicts an illustrative embodiment of a method used in portions of the systems described in FIGS. 1 and 5 to provide presentation feedback.

FIG. 6 depicts an illustrative embodiment of a method 600 used to establish and/or facilitate providing a shared environment (e.g., a CSCW environment) for multiple communication devices, such as devices 116A-D. Method 600 can provide feedback of all actions being performed by all participants in a CSCW environment, and can support baton passing and/or non-baton passing protocols in the CSCW environment.

Method 600 can allow all participants to freely perform all legal actions without "holding the baton" so that there is no need for a baton granting presenter's rights. Thus participants at their discretion can elect when they wish to work with a baton passing protocol or not. This provides greater flexibility and efficiencies in team interactions; for example, tasks can be parallelized during meetings. It can also be observed that participants would be able to perform and work together in a more natural setting, typical to a real-world situation. Method 600 can also provide feedback to: (1) an individual performing an action and/or (2) all the other participants observing the action.

Method 600 can begin at 602 where a communication session is established over a network between a group of communication devices, such as devices 116A-D. At 604, local adjustments can be monitored, such as by the conference server 130. For example, adjustment data can be received by the conference server 130 which was generated by a first communication device (e.g., device 116A) according to user input at the first communication device. The adjustment data can be representative of an adjustment made by the first communication device to content (e.g., drawing a line in a diagram, adding a slide, recording audio, and so forth) according to the user input to generate adjusted content. The content can be presented by the group of communication devices at display devices as part of the CSCW environment.

At 606, feedback can be obtained indicating which of the other devices have presented the adjustment to the content. For example, the conference server can be in communication with the other devices and can receive feedback (e.g., from the other devices once the adjustment has been presented by the other devices (e.g., individually from each of the other devices). At 608, feedback signal(s) can be provided to the device that generated the content adjustment (e.g., conference server 130 transmitting a feedback signal to the communication device 116A). The feedback signal can be indicative of completion of the presentation of the content adjustment at the other devices.

At 610, a determination can be made as to whether the content adjustment has been presented at all of the other communication devices. If so, method 600 can return to 604 to continue monitoring for content adjustments. If one or more of the other communication devices has not presented the content adjustment, then at 612 the conference server can attempt to make connection adjustments for those particular communication devices, such as establishing other connections.

In one embodiment, a determination that feedback information has not been received from a particular communication device can be according to expiration of a time period. In another embodiment, the CSCW environment can be managed according to a first-in-first-out protocol. In one embodiment, the providing of the feedback signal(s) enables the device which is the source of the content adjustment to present a feedback indicia that includes changing a presentation format of the adjusted content, where the presentation format comprises a color, a font, a size, a motion, a blinking, or any combination thereof.

Figure 7:
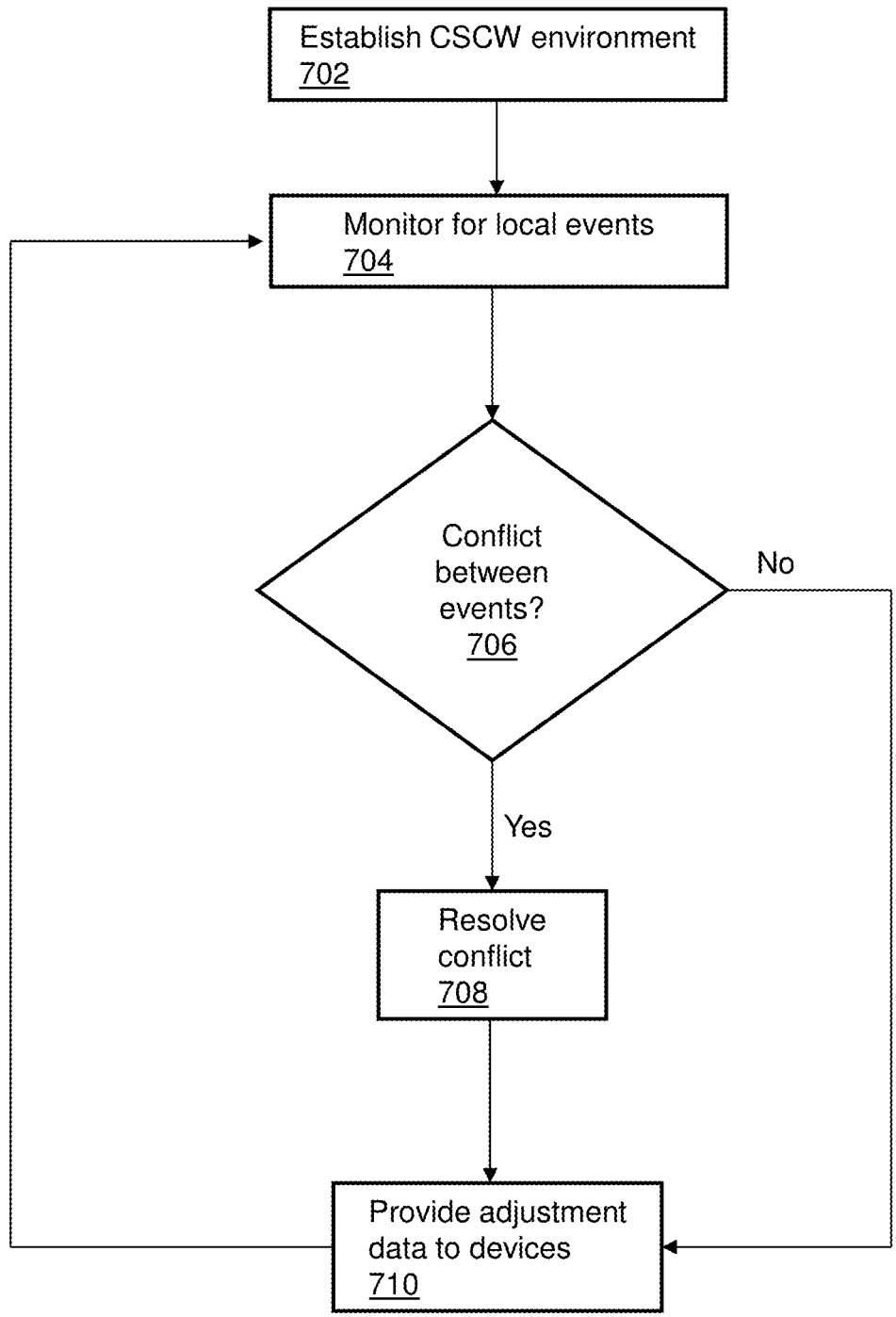
FIG. 7 depicts an illustrative embodiment of a method used in portions of the systems described in FIGS. 1 and 5 to facilitate event management in the CSCW environment.

FIG. 7 depicts an illustrative embodiment of a method 700 used to establish and/or facilitate providing a shared environment (e.g., a CSCW environment) for multiple communication devices, such as devices 116A-D. Method 700 can provide an efficient technique for managing events in a non-baton passing protocol in the CSCW environment. Method 700 can allow all or some of the participants to freely perform all or some of the legal actions without "holding the baton" so that there is no need for a baton granting presenter's rights. Method 700 can be combined in whole or in part with all or portions of method 600, such as to provide feedback to: (1) an individual performing an action and/or (2) all the other participants observing the action.

Method 700 can begin at 702 where a communication session is established over a network between a group of communication devices, such as devices 116A-D. The communication session can be a CSCW environment employing a non-baton passing protocol. At 704, local events can be monitored, such as by the conference server 130. The local events can be any type of an event that alters or adjusts the CSCW environment including adjustments to the content, adding new content, moving a pointer, navigation changes (e.g., rotation of the view), and other CSCW environment changes. For example, communication device 116A may begin to draw (a first event) resulting in content adjustment 216 being presented at the display device of communication device 116A. Communication device 116B can be initiating a second event, such as changing a slide that is being shown in the CSCW environment. At 706, a determination can be made as to whether the first and second events are in conflict. If there is no conflict then the first and second events can be provided to the other communication devices for presentation. However, in this example, since communication device 116A is trying to draw on the content of the presented slide while communication device 116B is trying to replace that particular slide with another slide, a conflict does exist.

At 708, conflict resolution can be implemented, such as by conference server 130, to resolve the conflict between the first and second events (or any number of events) and at 710 adjustment data representing the event (which may be resolved via the conflict resolution) can be provided to the other devices of the CSCW environment. In one embodiment, the conflicting events can be events that overlap in time.

In one embodiment, the conflict resolution can be based on a priority determination. For example, the priority determination can be based on types of events, such as editing content taking priority over replacing the entire content with another slide with other content. A priority list can be generated (with or without user input) to assist in managing the conflict resolution, such as creating a prioritizing order for various events including content edits, content view changes, navigation in the window presenting the content, adding new content, changing a slide to show new content, adding audio, changing audio, and so forth. In another example, the priority determination can be based on the particular device causing the event, such as providing communication device 116A with priority over communication device 116B for all events or for designated events.

In one embodiment, the conflict resolution can be based on designating layers of control over the CSCW environment to the communication devices 116A-D. For instance, communication device 116A can be authorized to utilize a first group of control commands (e.g., content editing, adding content, and replacing a slide to provide new content) while communication device 116B can be authorized to utilize a second group of control commands (e.g., navigating a pointer, panning, rotating and/or zooming the view of the content). In this example, the authorized control commands can be performed by one of the devices without preventing performance of the authorized control commands of the other of the devices. In one embodiment, unauthorized events (i.e., the communication device is not designated to perform the particular control command) can be prohibited at the unauthorized communication device or can be performed (in whole or in part) but not provided to the other devices, such as presenting an authorized edit of the content at the device making the unauthorized edit but not providing the unauthorized edit to any of the other devices. In another embodiment, a message or other prohibition indicia can be presented at the communication device that is attempting to make the unauthorized edit. These examples describe unauthorized edits, but the exemplary embodiments are applicable to any type of unauthorized event caused by a communication device (e.g., in response to user input) that does not have authorization to utilize the particular control command.

In one embodiment, conflict resolution can be according to other techniques, such as which device initiated the event first. In another embodiment, the conflict resolution can be independent of the timing of the initiation of the events. In one embodiment, the conflict resolution can be according to a combination of techniques, such as providing different devices with authorization to perform different groups of control commands and resolving any conflicts that occur between control commands of the different groups based on a priority determination, such as editing content from a first group of control commands taking priority over rotating the view of the content from a second group of control commands.

In another embodiment, conflicted events can be cancelled or delayed. For example, a first event editing the content in one particular way may take priority over a second event editing the content in another particular way, where the first event is provided to the other communication devices for presentation and the second event is cancelled or otherwise not distributed to the other devices. In another embodiment, a first event caused by a first communication device editing the content may take priority over a second event caused by a second communication device rotating the view of the content, where the first event is provided to the other communication devices for presentation and the second event is delayed and then provided to the other devices. In this example, a third communication device may receive and present the edited content (based on the first event) and then after a particular time period the third communication device may receive and present the rotated view of the edited content.

Figure 8:
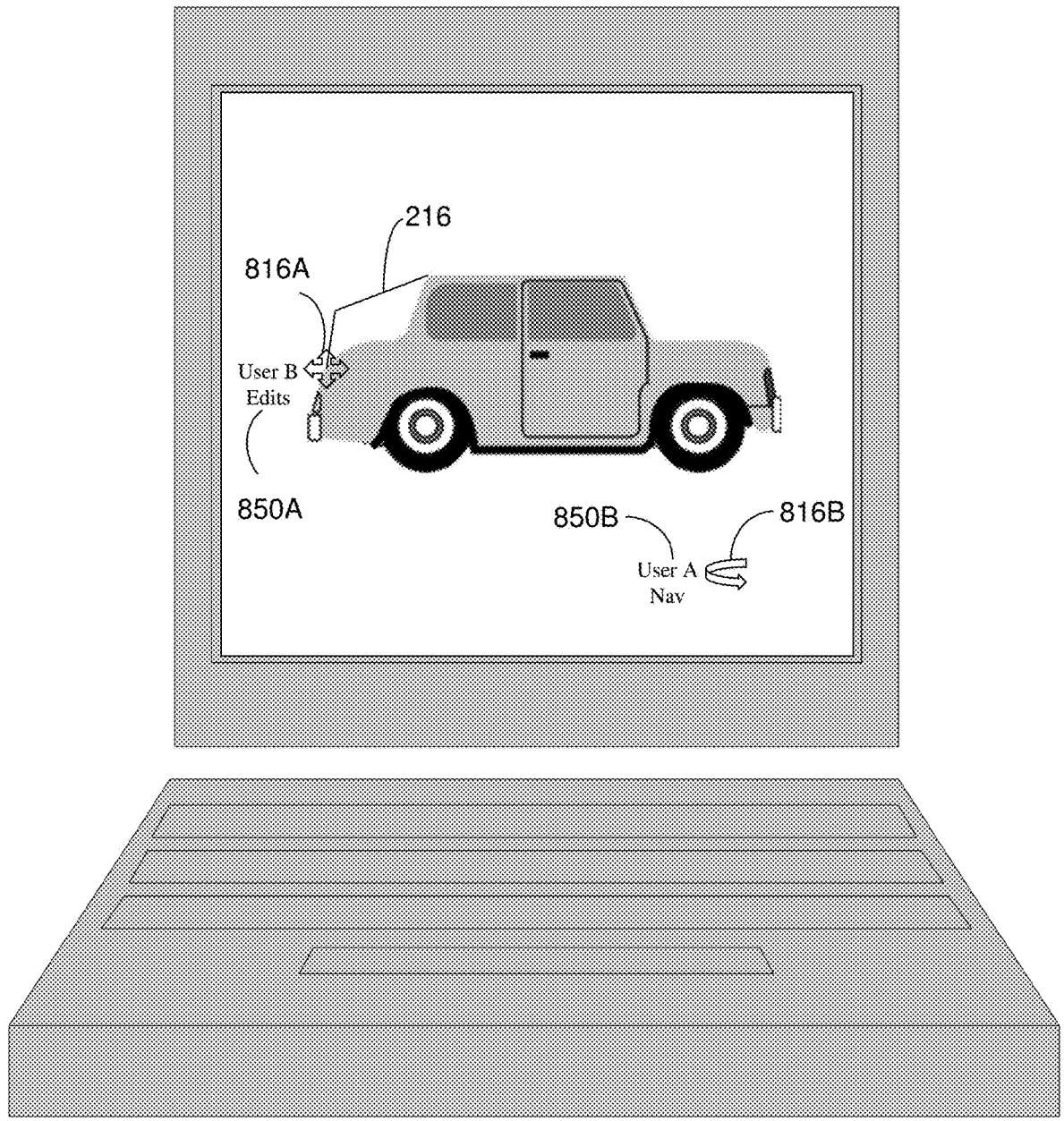
FIG. 8 depicts an illustrative embodiment of a communication device operating in the system of FIGS. 1 and 5 where event management is provided.

Referring to FIG. 8, communication device 116A is illustrated in which the adjustment 216 to the content is illustrated (e.g., immediately at the local device when the user of device 116A inputs the adjustment). A first graphical pointer 816A (e.g., any visual symbol that is manipulated via user input such as an arrow, a cross, and so forth) is presented which is controllable via user input at the communication device 116A. In this example, the pointer 816A has been used to generate the content adjustment 216 (i.e., the line drawing). A second graphical pointer 816B is presented (by the communication device 116A) which is controllable via user input at the communication device 116B. The pointers 816A and 816B can be visually distinct. In one embodiment, the pointers 816A and 816B can include identification information 850A, 850B, respectively. In one embodiment, the identification information can identify the particular communication device controlling the pointer, the user of the particular communication device controlling the pointer, and/or a username supplied via the particular communication device controlling the pointer. In another embodiment, the identification information can identify the authorized controls associated with the particular communication device such as communication device 116A being authorized to edit the content and communication device 116B being authorized to navigate.

Figure 9:
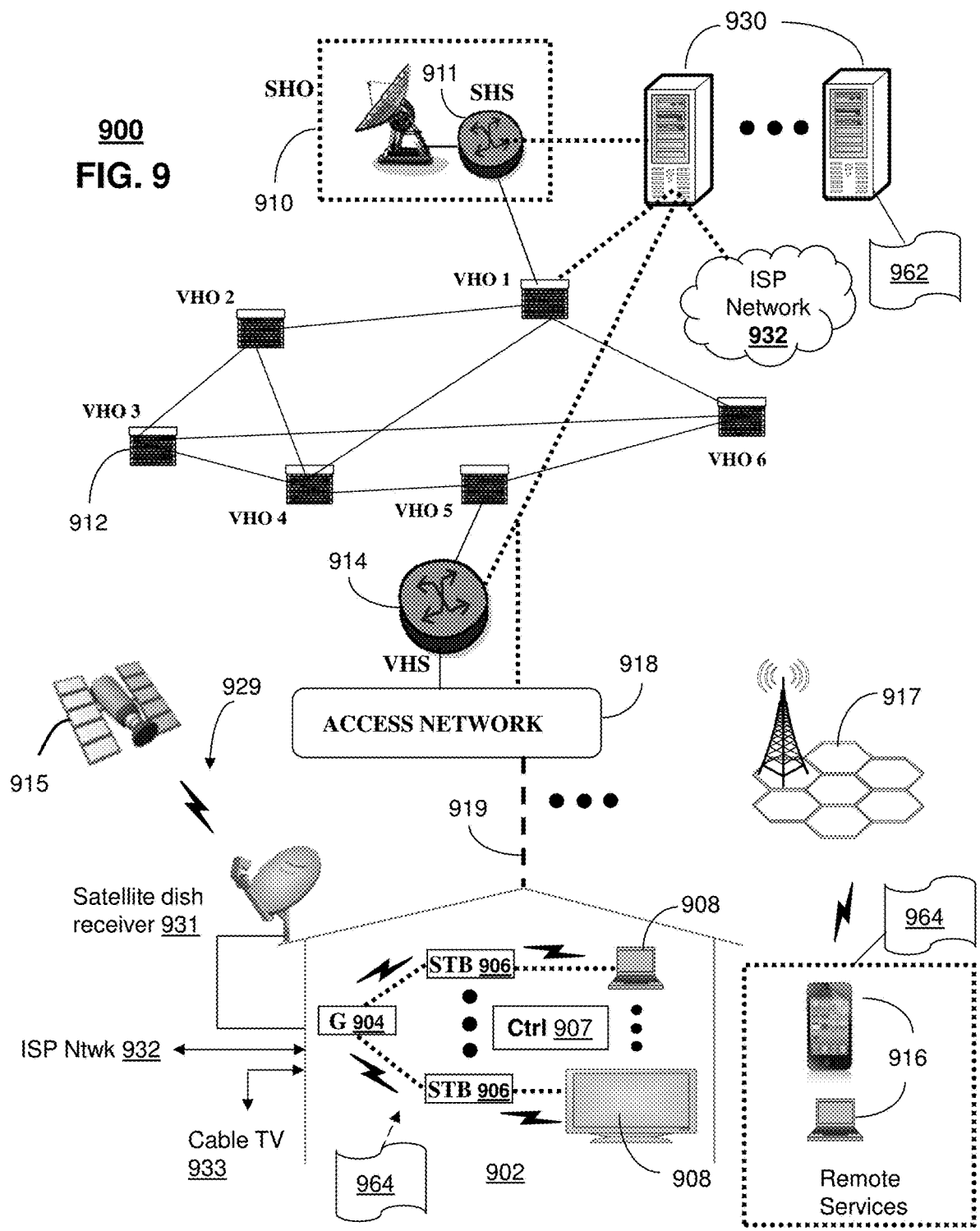
FIG. 9 depicts an illustrative embodiment of a communication system that provides media services including a collaborative environment with event management, presentation feedback and/or connection adjustments.

FIG. 9 depicts an illustrative embodiment of a communication system 900 for delivering media content and for providing CSCW environment for multiple participants. The communication system 900 can be overlaid or operably coupled with systems 100 and/or 500 as another representative embodiment of communication system 900.

For instance, a device illustrated in the communication system 900 of FIG. 9 can perform operations including: participating in a communication session over a network with a second communication device that is remote from the communication device where the communication session comprises a computer supported collaborative work environment utilizing a non-baton passing protocol; presenting content at a display device where the content is presented by the second communication device at a second display device; receiving first user input at the user interface, where second user input is received by the second communication device, where the content is adjusted according to the first and second user input to generate adjusted content, where the first user input is associated with a first group of control commands, where the second user input is associated with a second group of control commands, where the processor is prohibited from performing the second group of control commands, and where the second communication device is prohibited from performing the first group of control commands; and presenting the adjusted content at the display device.

In one embodiment, the first group of control commands comprises navigation, editing of the content, insertion of new content, or any combination thereof. In one embodiment, the presenting of the content includes presenting a first graphical pointer that is controllable via the processor, and a second graphical pointer that is controllable by the second communication device, where the first and second graphical pointers are visually distinguishable. In one embodiment, the second graphical pointer includes identification information associated with the second communication device. In one embodiment, the identification information includes an identity of a second user of the second communication device. In one embodiment, a third communication device participates in the communication session, where the adjusted content is further adjusted according to a third user input received at the third communication device to generate second adjusted content, where the third user input is associated with a third group of control commands, and where the processor and the second communication device are prohibited from performing the third group of control commands, and where the operations further comprise presenting the second adjusted content at the display device.

In one embodiment, the operations further comprise: providing adjustment data over the network, where the adjustment data is representative of the adjusting of the content according to the first user input, where the adjustment data enables the second communication device to generate and present the adjusted content at the second display device; receiving a feedback signal from a conference server indicating that the second communication device has presented the adjusted content at the second display device; and presenting a feedback indicia at the display device responsive to the receiving of the feedback signal, wherein the feedback indicia indicates that the second communication device has presented the adjusted content at the second display device. In one embodiment, the operations further comprise: presenting a non-presentation indicia at the display device responsive to the providing of the adjustment data over the network to the second communication device and prior to the receiving of the feedback signal, where the non-presentation indicia indicates that the second communication device has not presented the adjusted content at the second display device; and ceasing the presenting of the non-presentation indicia at the display device responsive to the receiving of the feedback signal indicating that the second communication device has presented the adjusted content at the second display device.

As another example, a device illustrated in the communication system 900 of FIG. 9 can participate in a communication session over a network with a group of other communication devices and can present content at a display device, where the content is presented by the group of other communication devices at a group of other display devices. The device can receive adjustment data over the network from a second communication device of the group of other communication devices, where the adjustment data is representative of an adjustment of the content according to user input received at the second communication device. The device can adjust the content according to the adjustment data to generate adjusted content and can present the adjusted content at the display device. The device can provide feedback information over the network indicating that the adjusted content has been presented by the communication device at the display device, where the providing of the feedback information enables the second communication device to present a feedback indicia at a second display device of the group of other display devices, and where the feedback indicia indicates that the communication device has presented the adjusted content at the display device. In one embodiment, the communication session can be managed according to a first-in-first-out protocol.

The media system 900 can include a super head-end office (SHO) 910 with at least one super headend office server (SHS) 911 which receives media content from satellite and/or terrestrial communication systems. In the present context, media content can represent, for example, audio content, moving image content such as 2D or 3D videos, video games, virtual reality content, still image content, and combinations thereof. The SHS server 911 can forward packets associated with the media content to one or more video head-end servers (VHS) 914 via a network of video head-end offices (VHO) 912 according to a multicast communication protocol.

The VHS 914 can distribute multimedia broadcast content via an access network 918 to commercial and/or residential buildings 902 housing a gateway 904 (such as a residential or commercial gateway). The access network 918 can represent a group of digital subscriber line access multiplexers (DSLAMs) located in a central office or a service area interface that provide broadband services over fiber optical links or copper twisted pairs 919 to buildings 902. The gateway 904 can use communication technology to distribute broadcast signals to media processors 906 such as Set-Top Boxes (STBs) which in turn present broadcast channels to media devices 908 such as computers or television sets managed in some instances by a media controller 907 (such as an infrared or RF remote controller).

The gateway 904, the media processors 906, and media devices 908 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 906 and subsystems of the IPTV media system for services such as video-on-demand (VoD), browsing an electronic programming guide (EPG), or other infrastructure services.

A satellite broadcast television system 929 can be used in the media system of FIG. 9. The satellite broadcast television system can be overlaid, operably coupled with, or replace the IPTV system as another representative embodiment of communication system 900. In this embodiment, signals transmitted by a satellite 915 that include media content can be received by a satellite dish receiver 931 coupled to the building 902. Modulated signals received by the satellite dish receiver 931 can be transferred to the media processors 906 for demodulating, decoding, encoding, and/or distributing broadcast channels to the media devices 908. The media processors 906 can be equipped with a broadband port to an Internet Service Provider (ISP) network 932 to enable interactive services such as VoD and EPG as described above.

In yet another embodiment, an analog or digital cable broadcast distribution system such as cable TV system 933 can be overlaid, operably coupled with, or replace the IPTV system and/or the satellite TV system as another representative embodiment of communication system 900. In this embodiment, the cable TV system 933 can also provide Internet, telephony, and interactive media services. System 900 enables various types of interactive television and/or services including IPTV, cable and/or satellite. The subject disclosure can apply to other present or next generation over-the-air and/or landline media content services system.

Some of the network elements of the IPTV media system can be coupled to one or more computing devices 930, a portion of which can operate as a web server for providing web portal services over the ISP network 932 to wireline media devices 908 or wireless communication devices 916.

Communication system 900 can also provide for all or a portion of the computing devices 930 to function as a conference server 930, similar to conference server 130 of FIG. 1 (herein referred to as server 930). The server 930 can use computing and communication technology to perform function 962, which can include among other things, management of different events caused by different devices in a non-baton passing protocol, management of feedback to a source device to indicate when content adjustments have been shown at recipient devices, and/or adjustments to connections for recipient devices that have failed to or are having difficulty presenting content adjustments. For instance, function 962 of server 930 can be similar to the functions described for server 130 of FIG. 1 in accordance with methods 600 and 700. The media processors 906 and wireless communication devices 916 can be provisioned with software functions 964 to utilize the services of server 930. For instance, functions 964 of media processors 906 and wireless communication devices 916 can be similar to the functions described for the communication devices 116A-D of FIG. 1 in accordance with methods 600 and 700, and can include participating in a CSCW environment with non-baton passing protocol, limiting actions to authorized control commands designated to the particular device, providing feedback data to the conference server 930 and/or presenting feedback indicia indicating which recipient devices have shown the content adjustments.

Multiple forms of media services can be offered to media devices over landline technologies such as those described above. Additionally, media services can be offered to media devices by way of a wireless access base station 917 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 10:
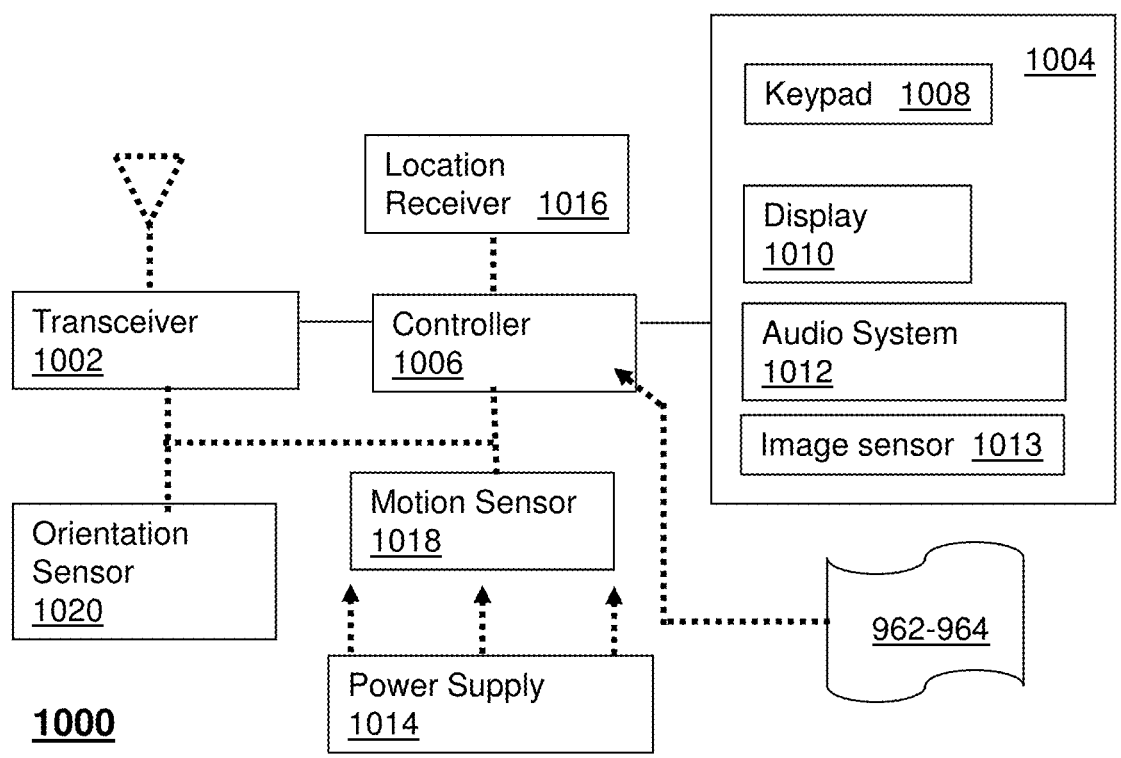
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in systems 100, 500 and 900 and can be configured to perform portions of method 600 of FIG. 6 and/or portions of method 700 of FIG. 7.

In one embodiment, communication device 1000 can perform operations comprising: participating in a communication session over a network with a second communication device that is remote from the communication device, where the communication session comprises a computer supported collaborative work environment utilizing a non-baton passing protocol; presenting content at a display device, wherein the content is presented by the second communication device at a second display device; presenting a first graphical pointer at the display device; receiving first user input; adjusting the first graphical pointer according to the first user input to generate a first adjustment to the first graphical pointer; presenting, at the display device, the first adjustment to the first graphical pointer while presenting the content; presenting, at the display device, a second graphical pointer at the display device while presenting the first adjustment to the first graphical pointer and while presenting the content, where the second communication device receives second user input, and where the second communication device adjusts the second graphical pointer according to the second user input to generate a second adjustment to the second graphical pointer; and presenting, at the display device, the second adjustment to the second graphical pointer while presenting the first adjustment to the first graphical pointer and while presenting the content, where the first and second graphical pointers are visually distinguishable, and where the second graphical pointer includes identification information associated with the second communication device.

In one embodiment, the identification information includes at least one of: an identity of a second user of the second communication device or authorized control commands of the second communication device. In one embodiment, the operations further comprise: receiving third user input; providing adjustment data over the network, where the adjustment data is representative of an adjustment of the content according to the third user input to generate adjusted content, where the adjustment data enables the second communication device to generate and present the adjusted content at a second display device; receiving a feedback signal from a conference server indicating that the second communication device has presented the adjusted content at the second display device; and presenting a feedback indicia at the display device responsive to the receiving of the feedback signal, where the feedback indicia indicates that the second communication device has presented the adjusted content at the second display device.

In one embodiment, the operations further comprise: presenting a non-presentation indicia at the display device responsive to the providing of the adjustment data over the network to the second communication device and prior to the receiving of the feedback signal, where the non-presentation indicia indicates that the second communication device has not presented the adjusted content at the second display device; and ceasing the presenting of the non-presentation indicia at the display device responsive to the receiving of the feedback signal indicating that the second communication device has presented the adjusted content at the second display device.

In one embodiment, the operations further comprise: receiving third user input at a user interface of the communication device, where fourth user input is received by the second communication device, where the content is adjusted according to the third and fourth user input to generate adjusted content, where the third user input is associated with a first group of control commands, where the fourth user input is associated with a second group of control commands, where the communication device is prohibited from performing the second group of control commands, and where the second communication device is prohibited from performing the first group of control commands; and presenting the adjusted content at the display device.

In one embodiment, the first group of control commands comprises navigation, editing of the content, insertion of new content, or any combination thereof. In one embodiment, a third communication device participates in the communication session, wherein the adjusted content is further adjusted according to a third user input received at the third communication device to generate second adjusted content, wherein the third user input is associated with a third group of control commands, and wherein the communication device and the second communication device are prohibited from performing the third group of control commands, and where the operations further comprise: presenting the second adjusted content at the display device.

In one embodiment, communication device 1000 can participate in a communication session over a network with a second communication device that is remote from the communication device; present content at a display device; receive user input at the user interface; adjust the content according to the user input to generate adjusted content; and present the adjusted content at the display device immediately or in real time responsive to the receiving of the user input. The communication device 1000 can provide adjustment data over the network, where the adjustment data is representative of the adjusting of the content according to the user input, and where the adjustment data enables the second communication device to generate and present the adjusted content at a second display device connected with the second communication device; receive a feedback signal indicating that the second communication device has presented the adjusted content at the second display device; and present a feedback indicia at the display device responsive to the receiving of the feedback signal, where the feedback indicia indicates that the second communication device has presented the adjusted content at the second display device. The communication device 1000 can present a non-presentation indicia at the display device responsive to the providing of the adjustment data over the network to the second communication device and prior to the receiving of the feedback signal, where the non-presentation indicia indicates that the second communication device has not presented the adjusted content at the second display device; and can cease the presenting of the non-presentation indicia at the display device responsive to the receiving of the feedback signal indicating that the second communication device has presented the adjusted content at the second display device. In one embodiment, the communication session can include a third communication device that is remote from the communication device, and the communication device 1000 can: provide the adjustment data over the network to the third communication device, where the adjustment data enables the third communication device to generate and present the adjusted content at a third display device connected with the third communication device; receive another feedback signal indicating that the third communication device has presented the adjusted content at the third display device; and present another feedback indicia at the display device responsive to the receiving of the other feedback signal, where the other feedback indicia indicates that the third communication device has presented the adjusted content at the third display device.

In one embodiment, communication device 1000 can present another non-presentation indicia at the display device responsive to the providing of the adjustment data over the network to the third communication device and prior to the receiving of the other feedback signal, where the non-presentation indicia indicates that the third communication device has not presented the adjusted content at the third display device; and cease the presenting of the other non-presentation indicia at the display device responsive to the receiving of the other feedback signal indicating that the third communication device has presented the adjusted content at the third display device.

In one embodiment, the communication device 1000 can provide the adjustment data over the network to the third communication device, where the adjustment data enables the third communication device to generate and present the adjusted content at a third display device connected with the third communication device, where a network connection with the third communication device is adjusted responsive to expiration of a time period without receiving another feedback signal indicating that the third communication device has presented the adjusted content at the third display device.

In one embodiment, the adjusting of the content according to the user input comprises adding a graphic to the content being presented. The presenting of the feedback indicia can include changing a presentation format of the graphic. The presentation format can include a color of the graphic, a font of the graphic, a size of the graphic, a motion of the graphic, a blinking of the graphic or any combination thereof. The presenting of the feedback indicia comprises presenting a feedback icon that is separate from the adjusted content being presented. In one embodiment, the feedback icon identifies the second communication device. In one embodiment, the adjusting of the content according to the user input includes replacing the content being presented with new content. In one embodiment, the communication session is managed by a conference server according to a baton-passing protocol.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of the devices of systems 100, 500, 900. It will be appreciated that the communication device 1000 can also represent other devices that can operate in those systems such as a gaming console and a media player. In addition, the controller 1006 can be adapted in various embodiments to perform the functions 962-964.

Upon reviewing the aforementioned embodiments, it would be evident to an artisan with ordinary skill in the art that said embodiments can be modified, reduced, or enhanced without departing from the scope of the claims described below. For example, the layered controls can be switched between communication devices during the CSCW session. Additionally, more than one device can have the same layers of controls, such as having two devices that can edit the content. In this example, a priority determination or other conflict resolution can be applied if the two devices attempt to edit the content resulting in a conflict.

As another example, the feedback mechanisms can be applied to other communication sessions with two or more participant devices which may or may not be CSCW environments. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
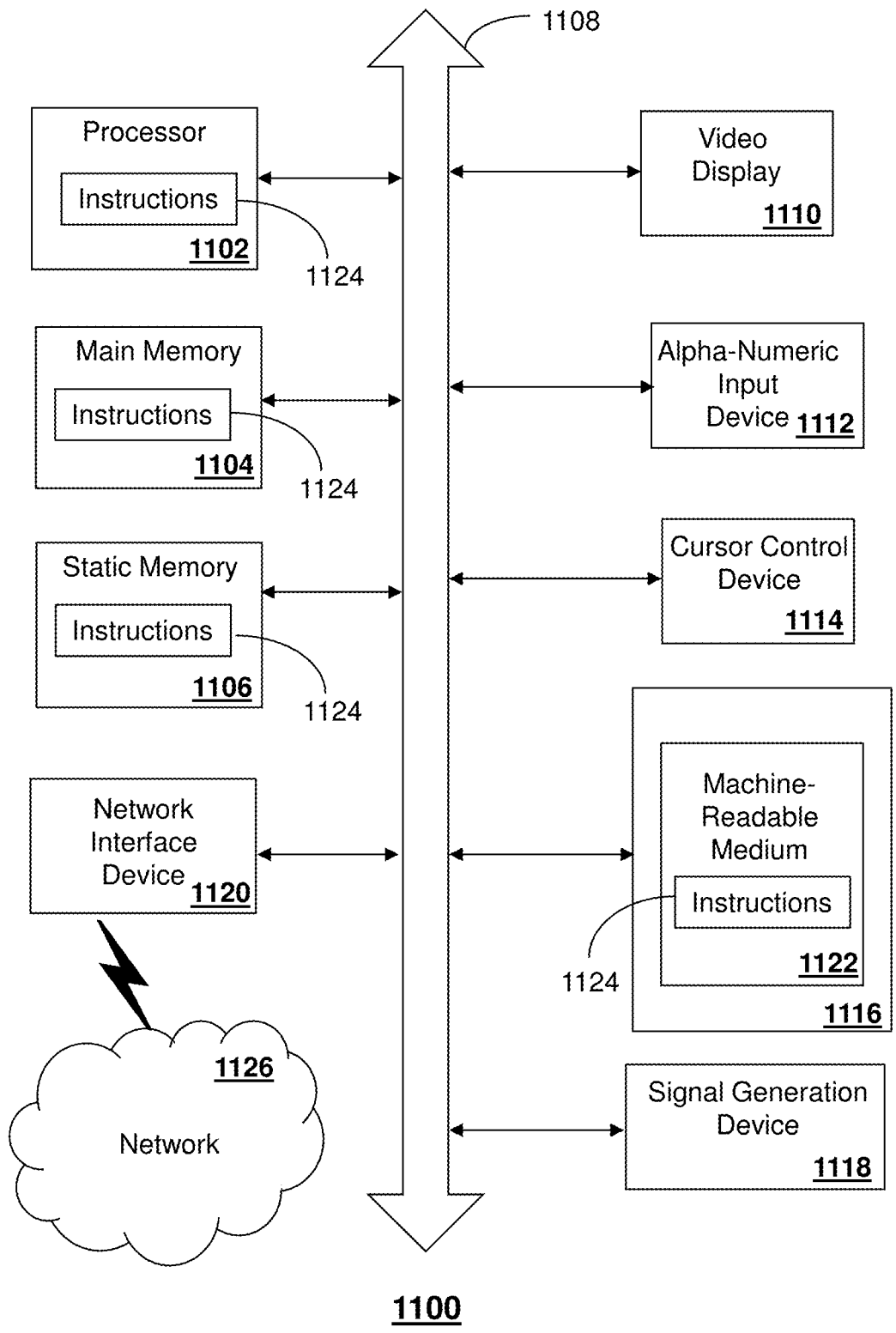
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the server 130 or 730, the devices 116A-D, or any other device described herein to manage events in a non-baton passing protocol and/or to provide feedback to a source device that generates a content adjustment and/or to enable adjustments to connection(s) for recipient devices to facilitate presentation of the content adjustments. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a graphical pointer control device 1114

(e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
    a user interface;
    a processing system including a processor coupled with the user interface; and
    a memory that stores executable instructions that, when executed by the processing system, facilitate performance of operations, comprising:
        participating in a communication session over a network with a second communication device and a third communication device both of which are remote from the communication device, the communication session comprising a computer supported collaborative work environment utilizing a non-baton passing protocol;
        presenting content at a display device, wherein the content is presented by the second communication device at a second display device, wherein the content is presented by the third communication device at a third display device;
        receiving first user input at the user interface, wherein second user input is received by the second communication device, wherein the content is adjusted according to the first user input and the second user input to generate adjusted content, wherein the first user input is associated with a first group of control commands, wherein the second user input is associated with a second group of control commands, wherein the processing system is prohibited from performing the second group of control commands, and wherein the second communication device is prohibited from performing the first group of control commands;
        presenting the adjusted content at the display device;
        providing adjustment data via a first communication connection to the second communication device over the network and a second communication connection to the third communication device over the network, wherein the adjustment data is representative of adjusting of the content according to the first user input, wherein the adjustment data enables the second communication device to generate and present the adjusted content at the second display device, wherein the adjustment data enables the third communication device to generate and present the adjusted content at the third display device;
        selecting the second communication connection to provide the adjustment data to the second communication device over the network in response to determining that a time period has expired and in response to receiving a first feedback signal that indicates that the third communication device adjusted the presentation on the third display device according to the adjustment data; and
        providing the adjustment data via the second communication connection to the second communication device over the network.

2. The communication device of claim 1, wherein the first group of control commands comprises navigation, editing of the content, insertion of new content, or any combination thereof.

3. The communication device of claim 2, wherein the presenting of the content includes presenting a first graphical pointer that is controllable via the processor, and a second graphical pointer that is controllable by the second communication device, and wherein the first graphical pointer and second graphical pointer are visually distinguishable.

4. The communication device of claim 3, wherein the second graphical pointer includes identification information associated with the second communication device.

5. The communication device of claim 4, wherein the identification information includes an identity of a second user of the second communication device.

6. The communication device of claim 1, wherein the second communication connection communicatively couples both the second communication device and the third communication device to the communication device.

7. The communication device of claim 1, wherein the operations further comprise:

receiving a second feedback signal from a conference server indicating that the second communication device has presented the adjusted content at the second display device; and presenting a feedback indicia at the display device responsive to the receiving of the second feedback signal, wherein the feedback indicia indicates that the second communication device has presented the adjusted content at the second display device.

8. The communication device of claim 7, wherein the operations further comprise:

determining that the second communication device did not present the adjusted content;

presenting a non-presentation indicia at the display device responsive to the providing of the adjustment data over the network to the second communication device and prior to the receiving of the second feedback signal, wherein the non-presentation indicia indicates that the second communication device has not presented the adjusted content at the second display device; and ceasing the presenting of the non-presentation indicia at the display device responsive to the receiving of the second feedback signal indicating that the second communication device has presented the adjusted content at the second display device.

9. A non-transitory, machine-readable storage device, comprising executable instructions that, when executed by a processor of a communication device, facilitate performance of operations, comprising:

participating in a communication session over a network with a second communication device and a third communication device both of which are remote from the communication device, the communication session comprising a computer supported collaborative work environment utilizing a non-baton passing protocol;

presenting content at a display device, wherein the content is presented by the second communication device at a second display device, wherein the content is presented by the third communication device at a third display device;

presenting a first graphical pointer at the display device;

receiving first user input;

adjusting the first graphical pointer according to the first user input to generate a first adjustment to the first graphical pointer;

presenting, at the display device, the first adjustment to the first graphical pointer while presenting the content;

presenting, at the display device, a second graphical pointer at the display device while presenting the first adjustment to the first graphical pointer and while presenting the content, wherein the second communication device receives second user input, and wherein the second communication device adjusts the second graphical pointer according to the second user input to generate a second adjustment to the second graphical pointer;

presenting, at the display device, the second adjustment to the second graphical pointer while presenting the first adjustment to the first graphical pointer and while presenting the content, wherein the first graphical pointer and second graphical pointer are visually distinguishable, and wherein the second graphical pointer includes identification information associated with the second communication device;

receiving third user input;

providing adjustment data via a first communication connection to the second communication device over the network and a second communication connection to the third communication device over the network, wherein the adjustment data is representative of an adjustment of content according to the third user input to generate adjusted content, wherein the adjustment data enables the second communication device to generate and present the adjusted content at the second display device, wherein the adjustment data enables the third communication device to generate and present the adjusted content at the third display device;

selecting the second communication connection to provide the adjustment data to the second communication device over the network in response to determining that a time period has expired and in response to receiving a first feedback signal that indicates that the third communication device adjusted the presentation on the third display according to the adjustment data; and providing the adjustment data via the second communication connection to the second communication device over the network.

10. The non-transitory, machine-readable storage device of claim 9, wherein the identification information includes at least one of: an identity of a second user of the second communication device or authorized control commands of the second communication device.

11. The non-transitory, machine-readable storage device of claim 9, wherein the operations further comprise:

receiving a second feedback signal from a conference server indicating that the second communication device has presented the adjusted content at the second display device; and presenting a feedback indicia at the display device responsive to the receiving of the second feedback signal, wherein the feedback indicia indicates that the second communication device has presented the adjusted content at the second display device.

12. The non-transitory, machine-readable storage device of claim 11, wherein the operations further comprise:

determining that the second communication device did not present the adjusted content presenting a non-presentation indicia at the display device responsive to the providing of the adjustment data over the network to the second communication device and prior to the receiving of the second feedback signal, wherein the non-presentation indicia indicates that the second communication device has not presented the adjusted content at the second display device; and ceasing the presenting of the non-presentation indicia at the display device responsive to the receiving of the second feedback signal indicating that the second communication device has presented the adjusted content at the second display device.

13. The non-transitory, machine-readable storage device of claim 11, wherein the second communication connection communicatively couples both the second communication device and the third communication device to the communication device.

14. The non-transitory, machine-readable storage device of claim 13, wherein the operations further comprise presenting second adjusted content at the display device.

15. The non-transitory, machine-readable storage device of claim 9, wherein the operations further comprise:

receiving fifth user input at a user interface of the communication device, wherein sixth user input is received by the second communication device, wherein the content is adjusted according to the fifth user input and the sixth user input to generate adjusted content, wherein the fifth user input is associated with a first group of control commands, wherein the sixth user input is associated with a second group of control commands, wherein the communication device is prohibited from performing the second group of control commands, and wherein the second communication device is prohibited from performing the first group of control commands; and presenting the adjusted content at the display device.

16. The non-transitory, machine-readable storage device of claim 15, wherein the first group of control commands comprises navigation, editing of the content, insertion of new content, or any combination thereof.

17. A method, comprising:

participating, by a processing system of a communication device, the processing system comprising a processor, in a communication session over a network with a second communication device and a third communication device both of which are remote from the communication device, the communication session comprising a computer supported collaborative work environment utilizing a non-baton passing protocol;

presenting, by the processing system, content at a display device, wherein the presenting the content includes presenting a first graphical pointer that is controllable via the processing system and a second graphical pointer that is controllable by the second communication device, wherein the content is presented by the second communication device at a second display device, wherein the content is presented by the third communication device at a third display device;

receiving, by the processing system, first user input at a user interface, wherein second user input is received by the second communication device, wherein the content is adjusted according to the first user input and the second user input to generate adjusted content, wherein the first user input is associated with a first group of control commands, wherein the second user input is associated with a second group of control commands, wherein the processing system is prohibited from performing the second group of control commands, and wherein the second communication device is prohibited from performing the first group of control commands;

presenting, by the processing system, the adjusted content at the display device;

providing by the processing system, adjustment data via a first communication connection to the second communication device over the network and a second communication connection to the third communication device over the network, wherein the adjustment data is representative of adjusting of the content according to the first user input, wherein the adjustment data enables the second communication device to generate and present the adjusted content at the second display device, wherein the adjustment data enables the third communication device to generate and present the adjusted content at the third display device;

selecting, by the processing system, the second communication connection to the second communication device over the network in response to determining, by the processing system, that a time period has expired and in response to receiving a first feedback signal that indicates that the third communication device adjusted the presentation on the third display according to the adjustment data; and providing, by the processing system, the adjustment data via the second communication connection to the second communication device over the network.

18. The method of claim 17, wherein the second graphical pointer includes identification information associated with the second communication device, wherein the identification information includes an identity of a second user of the second communication device.

19. The method of claim 17, further comprising:

receiving, by the processing system, a second feedback signal from a conference server indicating that the second communication device has presented the adjusted content at the second display device; and presenting, by the processing system, a feedback indicia at the display device responsive to the receiving of the second feedback signal, wherein the feedback indicia indicates that the second communication device has presented the adjusted content at the second display device.

20. The method of claim 19, further comprising:

determining, by the processing system, that the second communication device did not present the adjusted content;

presenting, by the processing system, a non-presentation indicia at the display device responsive to the providing of the adjustment data over the network to the second communication device and prior to the receiving of the second feedback signal, wherein the non-presentation indicia indicates that the second communication device has not presented the adjusted content at the second display device; and ceasing, by the processing system, the presenting of the non-presentation indicia at the display device responsive to the receiving of the second feedback signal indicating that the second communication device has presented the adjusted content at the second display device.

* * * * *